(12) United States Patent
Kamei

(10) Patent No.: US 10,487,251 B2
(45) Date of Patent: Nov. 26, 2019

(54) FRICTION MATERIAL

(71) Applicant: TUNGALOY CORPORATION, Fukushima (JP)

(72) Inventor: Mitsuo Kamei, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 302 days.

(21) Appl. No.: 15/563,331

(22) PCT Filed: Apr. 1, 2016

(86) PCT No.: PCT/JP2016/060904
§ 371 (c)(1),
(2) Date: Sep. 29, 2017

(87) PCT Pub. No.: WO2016/159341
PCT Pub. Date: Oct. 6, 2016

(65) Prior Publication Data
US 2018/0066168 A1 Mar. 8, 2018

(30) Foreign Application Priority Data
Apr. 2, 2015 (JP) .................................. 2015-075722

(51) Int. Cl.
*C09K 3/14* (2006.01)
*F16D 69/02* (2006.01)

(52) U.S. Cl.
CPC ............ *C09K 3/149* (2013.01); *F16D 69/027* (2013.01)

(58) Field of Classification Search
CPC . C09K 3/149; C22C 32/0005; C22C 33/0228; F16D 69/027
See application file for complete search history.

(56) References Cited

U.S. PATENT DOCUMENTS 3,844,800 A * 10/1974 Hooton ............... C22C 32/0089
75/233
3,891,398 A 6/1975 Odier

FOREIGN PATENT DOCUMENTS

| GB | 864769 A | | 4/1961 |
|---|---|---|---|
| JP | 63030617 A | * | 2/1988 |
| JP | H05-86359 A | | 4/1993 |
| JP | 08283701 A | * | 10/1996 |
| WO | 1999/019525 A1 | | 4/1999 |
| WO | WO-2013125717 A1 | * | 8/2013 |

OTHER PUBLICATIONS

International Search Report issued in PCT/JP2016/060904; dated Jul. 5, 2016.
International Preliminary Report on Patentability and Written Opinion issued in PCT/JP2016/060904 dated Oct. 3, 2017.

* cited by examiner

*Primary Examiner* — Jenny R Wu
(74) *Attorney, Agent, or Firm* — Studebaker & Brackett PC

(57) ABSTRACT

A friction material having 40 mass % or more to 80 mass % or less of a matrix of at least one of a metal, an alloy, a metal compound and an intermetallic compound; 5 mass % or more to 30 mass % or less of solid particles of at least one of a carbide, a nitride, an oxide and a sulfide; and 5 mass % or more to 40 mass % or less of a lubricant wherein: the matrix comprises, as elements, at least, 20 mass % or more to 50 mass % or less of Fe, 0.05 mass % or more to 5.0 mass % or less of P, and 40 mass % or more to 75 mass % or less of Ni, based on a total amount of the matrix; and a content of Cu as an element is 15 mass % or less based on a total amount of the matrix.

16 Claims, No Drawings

FRICTION MATERIAL

TECHNICAL FIELD

The present invention relates to a friction material.

BACKGROUND ART

A friction material with a high friction coefficient has been sought in accordance with demands for size and weight reductions of clutches and brakes. A friction material containing copper as its metal component is known as a friction material with a high friction coefficient. The prior art refers to a friction material which contains, as its main component, Cu comprised in a matrix with one or more kinds selected from among Sn, Zn, Ni, Fe and Co added thereto (see, for example, Patent Document 1).

CITATION LIST

Patent Documents

Patent Document 1: JPH05-086359 A

SUMMARY

Technical Problem

However, a friction material containing copper as its main component has high ductility. Thus, in the case of repeated braking with a member, such as a brake, or repeated intermittence of engine drive transmission with a member, such as a clutch, each of such members employing the above-mentioned friction material, or in the case of a long period of such braking or intermittence, frictional heat is generated so that high temperature occurs, and this is prone to cause plastic flow of the friction material. The occurrence of plastic flow leads to the problem of a reduction in the friction coefficient of the friction material. In order to solve such problem, it is known that a friction material is produced through a low-temperature sintering step so as to suppress the occurrence of plastic flow of the friction material. However, such friction material obtained through low-temperature sintering is accompanied with reduced sinterability, thereby leading to the problem of a reduction in the adhesion with a member intended to be joined, via sintering, to a member comprised of a friction material (hereinafter also referred to as a "friction member"), e.g., a metal back plate which holds a friction member.

In recent years, it has been pointed out, regarding a friction material containing copper as its main component, that copper which has, for example, fallen off from a friction member due to wear during the above-mentioned braking or intermittence may flow into a river or sea, thereby leading to environmental pollution.

The present invention has been made in light of the above circumstances, and one of the objects of the present invention is to provide a friction material which employs raw material powders which have a lower burden on the environment, where the friction material has excellent adhesion with a member intended to be joined, via sintering, to a friction member comprised of the friction material, and has a high friction coefficient. Another object of the present invention is to provide a friction material having a high friction coefficient even when the friction material is at a high temperature.

Solution to Problem

The present inventor has conducted various studies on friction materials. As a result, the present inventor has revealed that the devising of the composition of a matrix in a friction material allows for a friction material which has excellent adhesion with a member intended to be joined, via sintering, to a friction member, such as a metal back plate, and which has a high friction coefficient even when the friction material is at a high temperature, for example, during the above-mentioned braking or intermittence, and this has led to the present invention.

Namely, the gist of the present invention is as set forth below.

(1) A friction material comprising: 40 mass % or more to 80 mass % or less of a matrix of at least one kind selected from the group consisting of a metal, an alloy, a metal compound and an intermetallic compound; 5 mass % or more to 30 mass % or less of solid particles of at least one kind selected from the group consisting of a carbide, a nitride, an oxide and a sulfide of an element of at least one kind selected from the group consisting of Ti, Zr, Hf, V, Nb, Ta, Cr, Mo, W, Al, Mg and Si; and 5 mass % or more to 40 mass % or less of a lubricant of at least one kind selected from the group consisting of graphite, molybdenum disulfide, tungsten disulfide, boron nitride and calcium fluoride, wherein: the matrix comprises, as elements, at least, 20 mass % or more to 50 mass % or less of Fe, 0.05 mass % or more to 5.0 mass % or less of P, and 40 mass % or more to 75 mass % or less of Ni, based on a total amount of the matrix; and a content of Cu as an element is 15 mass % or less based on a total amount of the matrix.

(2) The friction material of (1), wherein a content ratio of Fe and P as elements relative to a content of Ni as an element [(Fe+P)/Ni] in the matrix is from 0.2 to 1.2.

(3) The friction material of (1) or (2), wherein the content of Cu as an element is 10 mass % or less based on a total amount of the matrix.

(4) The friction material of any of (1) to (3), wherein the matrix further comprises, as elements, 0.5 mass % or more to 3 mass % or less of Si and 0.5 mass % or more to 15 mass % or less of Mn.

(5) The friction material of any of (1) to (4), wherein the solid particles comprise at least one kind selected from the group consisting of aluminum oxide, zirconia, silica, zircon sand, rutile sand, magnesium oxide and tungsten carbide.

(6) The friction material of any of (1) to (5), wherein the friction material comprises 1 mass % or more to 20 mass % or less of a friction modifier of at least one kind selected from the group consisting of talc, mica, calcium carbide and coke.

Advantageous Effects of Invention

The present invention can provide a friction material which employs raw material powders which have a lower burden on the environment, the friction material having excellent adhesion with a member intended to be joined, via sintering, to a friction member comprised of the friction material and having a high friction coefficient. Further, the present invention can provide a friction material which has a high friction coefficient even at a high temperature.

An embodiment for carrying out the present invention (hereinafter simply referred to as the "present embodiment") will now be described in detail. However, the present invention is not limited to the present embodiment set forth below. Various modifications may be made to the present invention without departing from the gist of the invention. A friction material according to the present embodiment comprises a matrix, solid particles (hereinafter referred to as "hard particles") and a lubricant.

The matrix of the present embodiment is at least one kind selected from the group consisting of a metal, an alloy, a metal compound and an intermetallic compound. The friction material of the present embodiment contains 40 mass % or more to 80 mass % or less of the matrix based on a total amount of the friction material. If the content of the matrix of the present embodiment is 40 mass % or more, the hard particles and the lubricant can be prevented from falling off during the above-mentioned braking or intermittence, whereby a reduction in the wear resistance can be suppressed. Further, adhesion can be increased with respect to a member intended to be joined, via sintering, to a friction member comprised of the friction material (hereinafter referred to as a "member to be joined"; for example, a back plate which holds a friction member). Meanwhile, if the content of the matrix of the present embodiment is 80 mass % or less, the friction material can be prevented from being too dense, whereby a high friction coefficient can be achieved.

The matrix of the present embodiment contains, as elements, at least Fe, P and Ni. If the matrix contains Fe, the friction properties of the friction material are improved. If the matrix contains P, the sinterability of the friction material is improved. If the matrix contains Ni, the mechanical strength of the friction material is improved. The matrix contains, as elements: 20 mass % or more to 50 mass % or less of Fe; 0.05 mass % or more to 5.0 mass % or less of P; and 40 mass % or more to 75 mass % or less of Ni, based on a total amount of the matrix. Thus, the friction material is excellent in terms of friction properties and mechanical strength. If the content of Fe as an element is 20 mass % or more based on a total amount of the matrix, the friction material becomes sparse in an appropriate manner, resulting in a high friction coefficient. If the content of Fe as an element is 50 mass % or less, the sinterability is improved, whereby a high mechanical strength of the friction material can be achieved. If the content of P as an element is 0.05 mass % or more based on a total amount of the matrix, this prevents the friction material from being reduced, whereby the mechanical strength of the friction material can be prevented from being lowered. If the content of P as an element is 5.0 mass % or less, the liquid phase is prevented from leaching from the friction material during sintering, so that the friction material is prevented from being greatly deformed. In the entire matrix, if Ni constitutes less than 40 mass %, this leads to a reduced strength of the friction material, whereas, if Ni constitutes more than 75 mass %, the friction material becomes dense, resulting in a reduction in the friction coefficient. From the same perspective, based on a total amount of the matrix, the content of Fe as an element is preferably from 20 mass % or more to 40 mass % or less and is more preferably from 25 mass % or more to 35 mass % or less, the content of P as an element is preferably from 0.1 mass % or more to 2 mass % or less and is more preferably from 0.15 mass % or more to 1 mass % or less, and the content of Ni as an element is preferably from 45 mass % or more to 65 mass % or less and is more preferably from 45 mass % or more to 55 mass % or less.

In the matrix of the present embodiment, the content of Cu as an element is 15 mass % or less based on a total amount of the matrix. If the content of Cu is 15 mass % or less, the friction coefficient is less likely to be lowered even when the temperature of the friction material is high. This is because, due to the reduced ductility of the friction material, and less plastic flow caused by the heat generated during the above mentioned braking or intermittence. In particular, the content of Cu is preferably 10 mass % or less and is further preferably 5 mass % or less.

In the matrix, the content ratio of Fe and P as elements relative to the content of Ni as an element [Fe+P/Ni] is preferably from 0.2 or more to 1.2 or less. If the content ratio of Fe and P relative to the content of Ni is 0.2 or more, the friction coefficient tends to be increased, whereas, if such content ratio is 1.2 or less, the mechanical strength of the friction material tends to be improved. From the same perspective, the ratio [Fe+P/Ni] is more preferably from 0.5 or more to 1 or less and is further preferably from 0.5 or more to 0.8 or less.

The matrix of the present embodiment further contains Si and Mn as elements. The matrix preferably contains 0.5 mass % or more to 3 mass % or less of Si as an element and 0.5 mass % or more to 15 mass % or less of Mn based on a total amount of the matrix because an oxide film for Fe can be prevented from being formed. The formation of an oxide film may lead to reduced wear resistance. The content of Si based on a total amount of the matrix is preferably 0.5 mass % or more because this causes the effect of suppressing the formation of an oxide more effectively and reliably. Further, such content of Si indicates the tendency of an increased size of pores in the friction material further to increase the friction coefficient. Meanwhile, if the content of Si based on a total amount of the matrix is 3 mass % or less, this indicates the tendency of further increased adhesion with the member to be joined (for example, a back plate which holds a friction member) allowing for the further suppression of the peeling off therebetween. If the content of Mn based on a total amount of the matrix is 0.5 mass % or more, this indicates the tendency of the further improved effect of suppressing the formation of an oxide film to increase the friction coefficient, and if such content of Mn is 15 mass % or less, this indicates the tendency of further suppressed interposition of unreacted Mn to allow the adhesion of the friction material to be further prevented from being reduced. From the same perspective, based on a total amount of the matrix, the content of Si as an element is more preferably from 1 mass % or more to 3 mass % or less and is further preferably from 2 mass % or more to 3 mass % or less, and the content of Mn is more preferably from 3 mass % or more to 10 mass % or less and is further preferably from 5 mass % or more to 8 mass % or less.

The friction material of the present embodiment has a high friction coefficient and excellent wear resistance if it contains, as hard particles, 5 mass % or more to 30 mass % or less of at least one kind selected from the group consisting of a carbide, a nitride, an oxide and a sulfide of an element of at least one kind selected from the group consisting of Ti, Zr, Hf, V, Nb, Ta, Cr, Mo, W, Al, Mg and Si based on a total amount of the friction material. If the content of the hard particle is 15 mass % or more based on a total amount of the friction material, this leads to increase wear resistance. Meanwhile, if the content of the hard particle is 70 mass % or less, this leads to a relatively increased amount of the matrix or lubricant, resulting in an enhanced mechanical strength of the friction material, whereby the occurrence of shuddering or juddering can be suppressed during the above-mentioned braking or intermittence. From the same perspective, the content of the hard particles is preferably from 10 mass % or more to 25 mass % or less and is further preferably from 10 mass % or more to 20 mass % or less, based on a total amount of the friction material. Further, the hard particles preferably contains at least one kind selected from the group consisting of a carbide, a nitride, an oxide and a sulfide of an element of at least one kind selected from the group consisting of Ti, Zr, W, Al, Mg and Si, and more preferably contains at least one kind selected from the group consisting of carbides and oxides of the above elements.

Examples of the hard particles of the present embodiment include aluminum oxide ($Al_2O_3$), zirconia ($ZrO_2$), silica ($SiO_2$), zircon sand ($ZrSiO_4$), rutile sand ($TiO_2$), magnesium oxide (MgO) and tungsten carbide (WC). In particular, aluminum oxide, zircon sand and silica are preferred because further excellent wear resistance is achieved.

The friction material of the present embodiment preferably contains, as a lubricant, 5 mass % or more to 40 mass % or less, based on a total amount of the friction material, of at least one kind selected from the group consisting of graphite (C), molybdenum disulfide ($MoS_2$), tungsten disulfide ($WS_2$), boron nitride (BN) and calcium fluoride ($CaF_2$). This allows for suppression of the occurrence of shuddering or juddering during the above-mentioned braking or intermittence. If the content of the lubricant is 5 mass % or more based on a total amount of the friction material, shuddering or juddering can be suppressed, whereas if such content of the lubricant is 40 mass % or less, an increased friction coefficient is achieved. From the same perspective, the content of the lubricant is more preferably from 10 mass % or more to 30 mass % or less and is further preferably from 15 mass % or more to 25 mass % or less.

The friction material of the present embodiment preferably contains 1 mass % or more to 20 mass % or less of a friction modifier based on a total amount of the friction material because the friction coefficient during the above-mentioned braking or intermittence and the mechanical strength of the friction material can be effectively and reliably adjusted. From the same perspective, the content of the friction modifier is more preferably from 3 mass % or more to 15 mass % or less and is further preferably from 3 mass % or more to 10 mass % or less.

The friction modifier of the present embodiment preferably contains at least one kind selected from the group consisting of talc ($Mg_3Si_4O_{10}(OH)_2$), mica, calcium carbonate ($CaCO_3$) and coke (C) because the friction coefficient during the above-mentioned braking or intermittence and the mechanical strength of the friction material can be more effectively and reliably adjusted.

It should be noted that the composition ratio of the friction material of the present embodiment and the ratio of each element in the matrix can be obtained as set forth below. After polishing a surface of the friction material, the structure of such polished surface can be measured by an energy-dispersive X-ray spectroscope (EDS), a wavelength-dispersive X-ray spectroscope (WDS), etc., attached to a scanning electron microscope (SEM). The composition ratio of the friction material can be obtained by the EDS by magnifying the structure of the friction material by 50 to 2,000 times by the SEM. Further, the ratio of each element in the matrix can be obtained by the EDS by magnifying the structure of the friction material by 3,000 to 10,000 times by the SEM and excluding the hard particles and the lubricant.

Next, a method of manufacturing a friction material according to the present embodiment will be described using specific examples. The method of manufacturing a friction material according to the present embodiment is not particularly limited, as long as the configurations of the friction material may be achieved.

For example, the method of manufacturing a friction material of the present embodiment includes:

step (A): a step of formulating 40 mass % or more to 80 mass % or less of a metal powder which constitutes a matrix, 5 mass % or more to 30 mass % or less of a hard particle powder and 5 mass % or more to 40 mass % or less of a lubricant powder, and, as an optional component, 1 mass % or more to 20 mass % or less of a friction modifier powder (the total should be 100 mass %);

step (B): a mixing step of mixing the formulated raw material powders so as to prepare a mixture;

step (C): a molding step of molding the obtained mixture into a predetermined shape of friction material so as to obtain a molded body;

step (D): a sintering step of overlaying the molded body obtained in step (C) on a member to be joined (for example, a metal back plate) which holds the molded body, and then sintering the resulting product; and step (E): a polishing step of polishing a surface of the sintered body which has undergone step (D) so as to have a predetermined dimension. An alloy powder, a metal compound powder or an intermetallic compound powder may be used in place of the above-mentioned metal powder.

It should be noted that the average particle sizes of the raw material powders used in step (A) are measured by the Fisher method (Fisher Sub-Sieve Sizer (FSSS)) indicated in standard B330 of the American Society for Testing and Materials (ASTM).

Each step in the method of manufacturing a friction material of the present embodiment has the meaning set forth below.

In step (A), as to the raw material powders for the friction material of the present embodiment, each composition can be adjusted by formulating 40 mass % or more to 80 mass % or less of a metal powder which constitutes a matrix, 5 mass % or more to 30 mass % or less of a hard particle powder and 5 mass % or more to 40 mass % or less of a lubricant powder, and optionally 1 mass % or more to 20 mass % or less of a friction modifier powder. An alloy powder, a metal compound powder or an intermetallic compound powder may be used in place of the above-mentioned metal powder.

At this time, for example, based on a total amount of the matrix, 20 mass % or more to 50 mass % or less of an Fe powder with an average particle size of from 5 μm or more to 150 μm or less, 0.05 mass % or more to 5.0 mass % or less of a P powder with an average particle size of from 0.5 μm or more to 45 μm or less, and 40 mass % or more to 75 mass % or less of an Ni powder with an average particle size of 0.5 μm or more to 5.0 μm or less may be formulated. In order to set the content ratio of Fe and P as elements relative to the content of Ni as an element [(Fe+P)/Ni] in the matrix at from 0.2 or more to 1.2 or less, the formulation composition of the substances serving as materials for the respective elements may be adjusted.

As to the Fe component in the metal powder used in the manufacture of the friction material of the present embodiment, it is further preferable to use an iron-based metal powder containing 85 mass % or more of the Fe element, such metal powder being manufactured by either one or both of a carbonyl iron dust method and an atomization method as this enables the mechanical strength of the friction material to be further improved.

Specific examples of the iron-based metal powder manufactured by the carbonyl iron dust method include a carbonyl iron powder consisting of the Fe element (100 mass %). Further, specific examples of the iron-based metal powder manufactured by the atomization method include a phosphorus-containing iron powder consisting of 0.3 mass % or more to 15 mass % or less of the P element and the balance of the Fe element. In particular, a phosphorus-containing iron powder consisting of 0.5 mass % or more to 10.0 mass % or less of the P element and the balance of the Fe element is further preferred.

As to the Cu component of the metal powder used in the manufacture of the friction material of the present embodiment, a metal powder consisting of Cu may be used, by way of example.

Further, as to the Si and Mn components of the metal powder used in the manufacture of the friction material of the present embodiment, a metal powder consisting of Si and a metal powder consisting of Mn may be used, by way of example. As to another example of the Si component, a silicon-based metal powder consisting of Si and other metal elements (wherein the content of Si is generally 80 mass % or more) may be used. It is assumed in the present invention that Si is encompassed by metal.

For example, specific examples of a silicon-based metal powder containing 80 mass % or more of the Si element include a metal silicon powder comprised of the Si element and a ferrosilicon powder comprised of 80 mass % or more of the Si element and the balance of the Fe element.

In step (B), the average particle size of each raw material powder can be adjusted, and powders to be mixed with a predetermined formulation composition can be mixed in a uniform manner.

In step (C), the obtained mixture can be molded into a predetermined shape of friction material.

In step (D), the molded body obtained through step (C) and a member to be joined, for example, to a metal back plate for holding the molded body, are overlaid and then sintered, whereby it is possible to obtain the two effects, i.e., the sintering of the molded body and the adhesion between the molded body and the member to be joined. Preferably, when performing sintering under the conditions of a temperature ranging from 750° C. or higher to 1,100° C. or lower and a period of from 0.5 hours or longer to 2 hours or shorter, the molded body becomes dense, and the mechanical strength is thus increased. Further, the adhesion between the molded body and the member to be joined is increased. With an Ar gas atmosphere during sintering, a pressure of from 0.1 MPa or higher to 5 MPa or lower is preferably applied to the molded body as this enables the wear resistance of the friction material to be improved.

In step (E), the sintered body obtained through step (D) is polished, whereby the dimension of the sintered body can be adjusted.

The friction material of the present embodiment can be used as a material for a molded member serving as a means of arbitrarily controlling the rotation or motion of various machines, such as machine tools, construction machines, agricultural machines, automobiles, two wheelers, railroads, aircrafts and ships, i.e., a so-called clutch or brake. The friction material of the present embodiment employs raw material powders which have a lower burden on the environment, and such friction material accordingly places a lower burden on the environment. Further, the friction material of the present embodiment has excellent sinterability, and such friction material therefore has excellent adhesion with a member to be joined, such as a metal back plate, and has a high friction coefficient. Moreover, the friction material of the present embodiment has a high friction coefficient even when the friction material is at a high temperature during the above-mentioned braking or intermittence. More specifically, the friction material of the present embodiment has a high friction coefficient which is equal to or higher than that of a conventional friction material comprising copper as its main component.

EXAMPLES

Although the present invention will be described in further detail below, with examples, the present invention is not limited to such examples. Commercially available raw material powders were prepared. The average particle size of each raw material powder is shown in Table 1. It should be noted that the average particle sizes of the raw material powders were measured by the Fisher method (Fisher Sub-Sieve Sizer (FSSS)) indicated in standard B330 of the American Society for Testing and Materials (ASTM).

TABLE 1

|  | Raw Material Powder | Average Particle Size (μm) |
|---|---|---|
| Metal Powder | Fe | 100 |
|  | Phosphorus-containing Iron (99 mass % Fe, 1 mass % P) | 100 |
|  | Phosphorus-containing Iron (94 mass % Fe, 6 mass % P) | 100 |
|  | Ni | 5 |
|  | Cu | 40 |
|  | Si | 40 |
|  | Mn | 40 |
| Hard Particle Powder | Zircon Sand | 150 |
|  | Aluminum Oxide | 60 |
|  | Silica | 200 |
|  | Rutile Sand | 150 |
|  | Zirconia | 150 |
|  | Magnesium Oxide | 150 |
| Lubricant Powder | Graphite | 300 |
|  | Molybdenum Disulfide | 5 |
|  | Tungsten Disulfide | 5 |
|  | Calcium Fluoride | 150 |
|  | Boron Nitride | 5 |
| Friction Modifier Powder | Coke | 300 |
|  | Talc | 150 |
|  | Mica | 150 |
|  | Calcium Carbonate | 40 |

The prepared raw material powders were weighed so as to achieve each of the formulation compositions shown in Tables 2 and 3, and such weighed raw material powders were mixed by a mixer. The obtained mixture was molded into the shape of a brake pad. The obtained molded body and a back plate obtained by plating a surface of a steel sheet with copper were overlaid and pressure-sintered at the sintering temperature and sintering pressure as shown in Table 4. At this time, the resulting product was sintered in an Ar atmosphere for one hour.

TABLE 2

| | | | Sample Number | | | | | | | | |
|---|---|---|---|---|---|---|---|---|---|---|---|
| | | | Invention Sample 1 | Invention Sample 2 | Invention Sample 3 | Invention Sample 4 | Invention Sample 5 | Invention Sample 6 | Invention Sample 7 | Invention Sample 8 | Invention Sample 9 |
| Formulation Composition (mass %) | Metal Powder | Phosphorus-containing Iron (1 mass %) | — | 32.0 | — | — | — | — | — | — | — |
| | | Phosphorus-containing Iron (6 mass %) | 20.5 | — | 24.3 | 28.1 | 18.9 | 30.8 | 19.1 | 23.4 | 23.2 |
| | | Ni | 30.5 | 28.8 | 39.3 | 39.0 | 35.8 | 25.8 | 54.0 | 32.2 | 31.8 |
| | | Cu | 9.0 | — | — | — | 7.2 | — | — | — | 1.5 |
| | | Si | 1.7 | 1.8 | 2.0 | 1.7 | 1.7 | 1.7 | — | 2.8 | 1.5 |
| | | Mn | 4.5 | 4.6 | 4.5 | 0.5 | 4.5 | 4.5 | 2.0 | — | 5.3 |
| | | Total of Metal Powder | 66.2 | 67.2 | 70.1 | 69.3 | 68.1 | 62.8 | 75.1 | 58.4 | 63.3 |
| | Hard Particle Powder | Zircon Sand | 8.9 | 8.6 | 6.1 | 6.9 | 7.0 | 6.1 | 4.2 | — | 10.3 |
| | | Aluminum Oxide | 5.4 | — | 2.5 | 3.1 | 3.8 | 10.4 | — | 5.9 | 8.8 |
| | | Silica | — | 3.8 | — | 0.9 | 1.2 | 1.8 | — | 3.0 | — |
| | | Rutile Sand | 2.4 | — | — | — | — | — | 1.5 | — | — |
| | | Zirconia | — | — | 1.9 | — | — | — | 1.5 | — | — |
| | | Magnesium Oxide | — | 0.5 | — | — | — | — | — | — | 2.3 |
| | | Total of Hard Particle | 16.7 | 12.9 | 10.5 | 10.9 | 12.0 | 18.3 | 7.2 | 8.9 | 21.4 |
| | Lubricant Powder | Graphite | 13.3 | 7.7 | 11.0 | 11.0 | 11.7 | 11.0 | — | 19.5 | 6.5 |
| | | Molybdenum Disulfide | — | — | — | 0.9 | — | — | 5.3 | 6.3 | — |
| | | Tungsten Disulfide | — | — | — | — | — | — | 6.4 | — | — |
| | | Calcium Fluoride | 3.8 | 3.0 | 3.2 | 3.2 | 3.2 | 3.2 | — | — | — |
| | | Boron Nitride | — | 0.4 | — | — | — | — | — | — | — |
| | | Total of Lubricant | 17.1 | 11.1 | 14.2 | 15.1 | 14.9 | 14.2 | 11.7 | 25.8 | 6.5 |
| | Friction Modifier Powder | Coke | — | 7.3 | 3.5 | 3.5 | 2.4 | 3.5 | 6.0 | — | 3.2 |
| | | Talc | — | — | — | — | 1.4 | — | — | 4.4 | 2.7 |
| | | Mica | — | 1.5 | 1.2 | 1.2 | 1.2 | 1.2 | — | — | — |
| | | Calcium Carbonate | — | — | 0.5 | — | — | — | — | 2.5 | 2.9 |
| | | Total of Friction | — | 8.8 | 5.2 | 4.7 | 5.0 | 4.7 | 6.0 | 6.9 | 8.8 |
| | | Total of Formulation Composition | 100 | 100 | 100 | 100 | 100 | 100 | 100 | 100 | 100 |

TABLE 3

| | | | Sample Number | | | | | | | | |
|---|---|---|---|---|---|---|---|---|---|---|---|
| | | | Comparative Sample 1 | Comparative Sample 2 | Comparative Sample 3 | Comparative Sample 4 | Comparative Sample 5 | Comparative Sample 6 | Comparative Sample 7 | Comparative Sample 8 | Comparative Sample 9 |
| Formulation Composition (mass %) | Metal Powder | Fe | — | — | — | — | — | — | — | — | 24.9 |
| | | Phosphorus-containing Iron (1 mass %) | — | — | 25.6 | — | — | — | — | — | — |
| | | Phosphorus-containing Iron (6 mass %) | 29.0 | 24.9 | — | 8.5 | 16.2 | 13.0 | 18.4 | 4.9 | — |
| | | Ni | 22.0 | 30.1 | 36.6 | 55.9 | 25.5 | 23.0 | 30.5 | 8.0 | 30.1 |
| | | Cu | — | — | 13.7 | — | — | — | 24.2 | 45.1 | — |
| | | Si | 1.7 | 1.7 | 3.6 | 1.7 | 1.1 | — | 2.3 | 0.8 | 1.7 |
| | | Mn | 4.6 | 9.1 | — | 4.4 | 1.2 | — | 2.0 | 0.7 | 4.5 |
| | | Total of Metal Powder | 57.3 | 65.8 | 79.5 | 70.5 | 44.0 | 36.0 | 77.4 | 59.5 | 61.2 |
| | Hard Particle Powder | Zircon Sand | 9.1 | — | 8.8 | 5.9 | 21.4 | 10.5 | 6.0 | 10.5 | 10.0 |
| | | Aluminum Oxide | 5.5 | 4.5 | 2.7 | 3.3 | 8.0 | 7.6 | 3.6 | 7.6 | 7.6 |
| | | Silica | 3.0 | — | 2.0 | 1.8 | 5.2 | — | — | — | — |
| | | Rutile Sand | — | — | — | — | — | 4.0 | — | — | — |
| | | Zirconia | — | — | — | — | — | 2.9 | — | — | — |
| | | Magnesium Oxide | — | — | — | — | — | — | — | — | — |
| | | Total of Hard Particle | 17.6 | 4.5 | 13.5 | 11.0 | 34.6 | 25.0 | 9.6 | 18.1 | 17.6 |
| | Lubricant Powder | Graphite | 15.8 | 15.8 | 1.6 | 10.8 | 9.6 | 24.0 | 10.6 | 10.4 | 10.4 |
| | | Molybdenum Disulfide | — | — | — | — | — | 5.5 | — | — | — |
| | | Tungsten Disulfide | — | 8.0 | — | — | — | — | — | — | — |
| | | Calcium Fluoride | 3.9 | 3.9 | 1.5 | 3.1 | 2.4 | — | 2.4 | 2.5 | 2.5 |
| | | Boron Nitride | — | — | — | — | — | — | — | — | — |
| | | Total of Lubricant | 19.7 | 27.7 | 3.1 | 13.9 | 12.0 | 29.5 | 13.0 | 12.9 | 12.9 |
| | Friction Modi- | Coke | 3.4 | 1.0 | 2.7 | 3.5 | 6.1 | 3.5 | — | 3.3 | 3.3 |
| | | Talc | — | 1.0 | — | — | — | — | — | — | — |

TABLE 3-continued

|  |  | Comparative Sample 1 | Comparative Sample 2 | Comparative Sample 3 | Comparative Sample 4 | Comparative Sample 5 | Comparative Sample 6 | Comparative Sample 7 | Comparative Sample 8 | Comparative Sample 9 |
|---|---|---|---|---|---|---|---|---|---|---|
| fier-Powder | Mica | 2.0 | — | 1.2 | 1.1 | 3.3 | 6.0 | — | 6.2 | 5.0 |
|  | Calcium Carbonate | — | — | — | — | — | — | — | — | — |
|  | Total of Friction | 5.4 | 2.0 | 4.9 | 4.6 | 9.4 | 9.5 | — | 9.5 | 8.3 |
|  | Total of Formulation Composition | 100 | 100 | 100 | 100 | 100 | 100 | 100 | 100 | 100 |

TABLE 4

| Sample Number | Sintering Temperature (° C.) | Sintering Pressure (MPa) |
|---|---|---|
| Invention Sample 1 | 750 | 3 |
| Invention Sample 2 | 900 | 3 |
| Invention Sample 3 | 950 | 3 |
| Invention Sample 4 | 1000 | 3 |
| Invention Sample 5 | 900 | 0.5 |
| Invention Sample 6 | 900 | 1 |
| Invention Sample 7 | 900 | 2 |
| Invention Sample 8 | 900 | 4 |
| Invention Sample 9 | 900 | 5 |
| Comparative Sample 1 | 800 | 3 |
| Comparative Sample 2 | 900 | 3 |
| Comparative Sample 3 | 950 | 3 |
| Comparative Sample 4 | 900 | 1 |
| Comparative Sample 5 | 900 | 2 |
| Comparative Sample 6 | 900 | 3 |
| Comparative Sample 7 | 900 | 4 |
| Comparative Sample 8 | 900 | 5 |
| Comparative Sample 9 | 900 | 3 |

As to the friction material obtained via sintering, the dimension was adjusted by means of polishing so as to obtain a sample being a brake-shaped friction material (friction member).

The composition of the matrix of the obtained sample was measured using EDX. The results are shown in Tables 5 and 6.

TABLE 5

|  |  | Invention Sample 1 | Invention Sample 2 | Invention Sample 3 | Invention Sample 4 | Invention Sample 5 | Invention Sample 6 | Invention Sample 7 | Invention Sample 8 | Invention Sample 9 |
|---|---|---|---|---|---|---|---|---|---|---|
| Composition of Matrix (mass %) | Fe | 29.1 | 47.1 | 32.6 | 38.1 | 26.1 | 46.1 | 23.9 | 37.7 | 34.5 |
|  | P | 1.9 | 0.5 | 2.1 | 2.4 | 1.7 | 2.9 | 1.5 | 2.4 | 2.2 |
|  | Ni | 46.1 | 42.9 | 56.1 | 56.3 | 52.6 | 41.1 | 71.9 | 55.1 | 50.2 |
|  | Cu | 13.6 | 0.0 | 0.0 | 0.0 | 10.6 | 0.0 | 0.0 | 0.0 | 2.4 |
|  | Si | 2.6 | 2.7 | 2.9 | 2.5 | 2.5 | 2.7 | 0.0 | 4.8 | 2.4 |
|  | Mn | 6.8 | 6.8 | 6.4 | 0.7 | 6.6 | 7.2 | 2.7 | 0.0 | 8.4 |
|  | Total | 100 | 100 | 100 | 100 | 100 | 100 | 100 | 100 | 100 |
| (Fe + P)/Ni |  | 0.67 | 1.11 | 0.62 | 0.72 | 0.53 | 1.19 | 0.35 | 0.73 | 0.73 |

TABLE 6

|  |  | Comparative Sample 1 | Comparative Sample 2 | Comparative Sample 3 | Comparative Sample 4 | Comparative Sample 5 | Comparative Sample 6 | Comparative Sample 7 | Comparative Sample 8 | Comparative Sample 9 |
|---|---|---|---|---|---|---|---|---|---|---|
| Composition of Matrix (mass %) | Fe | 47.6 | 35.6 | 31.9 | 11.3 | 34.6 | 33.9 | 22.3 | 7.7 | 40.7 |
|  | P | 3.0 | 2.3 | 0.3 | 0.7 | 2.2 | 2.2 | 1.4 | 0.5 | 0.0 |
|  | Ni | 38.4 | 45.7 | 46.0 | 79.3 | 58.0 | 63.9 | 39.4 | 13.4 | 49.2 |
|  | Cu | 0.0 | 0.0 | 17.2 | 0.0 | 0.0 | 0.0 | 31.3 | 75.8 | 0.0 |
|  | Si | 3.0 | 2.6 | 4.5 | 2.4 | 2.5 | 0.0 | 3.0 | 1.3 | 2.8 |
|  | Mn | 8.0 | 13.8 | 0.0 | 6.2 | 2.7 | 0.0 | 2.6 | 1.2 | 7.4 |
|  | Total | 100 | 100 | 100 | 100 | 100 | 100 | 100 | 100 | 100 |
| (Fe + P)/Ni |  | 1.32 | 0.83 | 0.70 | 0.15 | 0.64 | 0.57 | 0.60 | 0.61 | 0.83 |

Using the obtained samples (test pieces), the following friction test was conducted. The results are shown in Table 7.

[Friction Test]
Test apparatus: Inertia friction tester
Moment of inertia: 12.25 kgm$^2$
Velocity: 42 m/s
Contact pressure: 980 kPa
Test piece shape: 25 mm×25 mm×10 mm
Brake start temperature: 350° C.

TABLE 7

| Sample Number | Friction Coefficient |
|---|---|
| Invention Sample 1 | 0.60 |
| Invention Sample 2 | 0.65 |
| Invention Sample 3 | 0.68 |
| Invention Sample 4 | 0.65 |
| Invention Sample 5 | 0.58 |
| Invention Sample 6 | 0.72 |
| Invention Sample 7 | 0.71 |
| Invention Sample 8 | 0.68 |
| Invention Sample 9 | 0.64 |
| Comparative Sample 1 | 0.54 |
| Comparative Sample 2 | 0.45 |
| Comparative Sample 3 | 0.43 |
| Comparative Sample 4 | 0.51 |
| Comparative Sample 5 | 0.42 |
| Comparative Sample 6 | 0.47 |
| Comparative Sample 7 | 0.41 |
| Comparative Sample 8 | 0.40 |
| Comparative Sample 9 | 0.42 |

Table 7 indicates that the friction coefficient of any of the invention samples is 0.58 or more and, in turn, indicates that each invention sample has a higher friction coefficient than that of each comparative sample.

Using the obtained samples, the following shearing test was conducted so as to measure the shearing strength between the friction material and the back plate in each sample. The results are shown in Table 8.

[Shearing Test]
Shearing strength was measured by a method conforming to the Japanese Industrial Standards "Automotive parts—Drum brake shoe assemblies and disc brake pad—Shear test procedure" (JISD4422). The shearing test was conducted at room temperature (23° C.) and a temperature of 300° C.

TABLE 8

| Sample Number | Shearing strength at room temperature (MPa) | Shearing strength at 300° C. (MPa) |
|---|---|---|
| Invention Sample 1 | 15 | 13 |
| Invention Sample 2 | 12 | 10 |
| Invention Sample 3 | 9 | 7 |
| Invention Sample 4 | 13 | 11 |
| Invention Sample 5 | 14 | 12 |
| Invention Sample 6 | 7 | 7 |
| Invention Sample 7 | 10 | 8 |
| Invention Sample 8 | 11 | 10 |
| Invention Sample 9 | 8 | 8 |
| Comparative Sample 1 | 7 | 5 |
| Comparative Sample 2 | 6 | 4 |
| Comparative Sample 3 | 6 | 4 |
| Comparative Sample 4 | 5 | 3 |
| Comparative Sample 5 | 3 | 3 |
| Comparative Sample 6 | 4 | 4 |
| Comparative Sample 7 | 5 | 2 |
| Comparative Sample 8 | 5 | 2 |
| Comparative Sample 9 | 6 | 4 |

Table 8 indicates that the shearing strength of any of the invention samples is 7 MPa or more at either room temperature or 300° C. Table 8 further indicates that the shearing strength of each invention sample is generally higher than that of each comparative sample and, in turn, indicates that each invention sample involves excellent adhesion between the friction material and the back plate.

Using the obtained samples, the following wear test was conducted.

The results are shown in Table 9.

[Wear Test]
Test apparatus: Inertia friction tester
Moment of inertia: 12.25 kgm$^2$
Velocity: 42 m/s
Contact pressure: 2,000 kPa
Test piece shape: 25 mm×25 mm×10 mm
Brake start temperature: 100° C. or less

TABLE 9

| Sample Number | Amount of wear (mm) |
|---|---|
| Invention Sample 1 | 0.31 |
| Invention Sample 2 | 0.21 |
| Invention Sample 3 | 0.45 |
| Invention Sample 4 | 0.38 |
| Invention Sample 5 | 0.41 |
| Invention Sample 6 | 0.33 |
| Invention Sample 7 | 0.29 |
| Invention Sample 8 | 0.32 |
| Invention Sample 9 | 0.35 |
| Comparative Sample 1 | 0.42 |
| Comparative Sample 2 | 0.52 |
| Comparative Sample 3 | 0.65 |
| Comparative Sample 4 | 0.49 |
| Comparative Sample 5 | 0.62 |
| Comparative Sample 6 | 0.63 |
| Comparative Sample 7 | 0.57 |
| Comparative Sample 8 | 0.71 |
| Comparative Sample 9 | 0.58 |

Table 9 indicates that the amount of wear of any of the invention samples is 0.45 mm or less and, in turn, indicates that such amount of wear is generally smaller than that of each comparative sample, thereby leading to excellent wear resistance.

INDUSTRIAL APPLICABILITY

The friction material of the present invention employs raw material powders which have a lower burden on the environment, and such friction material itself accordingly places a lower burden on the environment. The friction material of the present invention has excellent adhesion with a member to be joined, such as a back plate for holding a friction member which employs the friction material, and has a high friction coefficient. Further, the friction material of the present invention has a high friction coefficient even when the friction material is at a high temperature during the above-mentioned braking or intermittence. Therefore, the friction material of the present invention has high industrial applicability in the relevant technical field.

What is claimed is:

1. A friction material comprising: 40 mass % or more to 80 mass % or less of a matrix of at least one kind selected from the group consisting of a metal, an alloy, a metal compound and an intermetallic compound; 5 mass % or more to 30 mass % or less of solid particles of at least one kind selected from the group consisting of a carbide, a nitride, an oxide and a sulfide of an element of at least one kind selected from the group consisting of Ti, Zr, Hf, V, Nb, Ta, Cr, Mo, W, Al, Mg and Si; and 5 mass % or more to 40 mass % or less of a lubricant of at least one kind selected from the group consisting of graphite, molybdenum disulfide, tungsten disulfide, boron nitride and calcium fluoride, wherein:

the matrix comprises, as elements, at least, 20 mass % or more to 50 mass % or less of Fe, 0.05 mass % or more to 5.0 mass % or less of P, and 40 mass % or more to 75 mass % or less of Ni, based on a total amount of the matrix; and a content of Cu as an element is 15 mass % or less based on a total amount of the matrix.

2. The friction material according to claim 1, wherein a mass content ratio of Fe and P as elements relative to a mass content of Ni as an element [(Fe+P)/Ni] in the matrix is from 02 or more to 1.2 or less.

3. The friction material according to claim 1, wherein the content of Cu as an element is 10 mass % or less based on a total amount of the matrix.

4. The friction material according to claim 1, wherein the matrix further comprises, as elements, 0.5 mass % or more to 3 mass % or less of Si and 0.5 mass % or more to 15 mass % or less of Mn.

5. The friction material according to claim 1, wherein the solid particles comprise at least one kind selected from the group consisting of aluminum oxide, zirconia, silica, zircon sand, rutile sand, magnesium oxide and tungsten carbide.

6. The friction material according to claim 1, wherein the friction material comprises 1 mass % or more to 20 mass % or less of a friction modifier of at least one kind selected from the group consisting of talc, mica, calcium carbide and coke.

7. The friction material according to claim 2, wherein the content of Cu as an element is 10 mass % or less based on a total amount of the matrix.

8. The friction material according to claim 2, wherein the matrix further comprises, as elements, 0.5 mass % or more to 3 mass % or less of Si and 0.5 mass % or more to 15 mass % or less of Mn.

9. The friction material according to claim 3, wherein the matrix further comprises, as elements, 0.5 mass % or more to 3 mass % or less of Si and 0.5 mass % or more to 15 mass % or less of Mn.

10. The friction material according to claim 2, wherein the solid particles comprise at least one kind selected from the group consisting of aluminum oxide, zirconia, silica, zircon sand, rutile sand, magnesium oxide and tungsten carbide.

11. The friction material according to claim 3, wherein the solid particles comprise at least one kind selected from the group consisting of aluminum oxide, zirconia, silica, zircon sand, rutile sand, magnesium oxide and tungsten carbide.

12. The friction material according to claim 4, wherein the solid particles comprise at least one kind selected from the group consisting of aluminum oxide, zirconia, silica, zircon sand, rutile sand, magnesium oxide and tungsten carbide.

13. The friction material according to claim 2, wherein the friction material comprises 1 mass % or more to 20 mass % or less of a friction modifier of at least one kind selected from the group consisting of talc, mica, calcium carbide and coke.

14. The friction material according to claim 3, wherein the friction material comprises 1 mass % or more to 20 mass % or less of a friction modifier of at least one kind selected from the group consisting of talc, mica, calcium carbide and coke.

15. The friction material according to claim 4, wherein the friction material comprises 1 mass % or more to 20 mass % or less of a friction modifier of at least one kind selected from the group consisting of talc, mica, calcium carbide and coke.

16. The friction material according to claim 5, wherein the friction material comprises 1 mass % or more to 20 mass % or less of a friction modifier of at least one kind selected from the group consisting of talc, mica, calcium carbide and coke.

* * * * *